J. V. SANDQUIST.
LINK.
APPLICATION FILED JULY 13, 1920.

1,421,997. Patented July 4, 1922.

WITNESS:
L. B. James
E. Yeager

J. V. Sandquist
INVENTOR
BY Victor J. Evans
ATTORNEY

UNITED STATES PATENT OFFICE.

JOHN V. SANDQUIST, OF HOUSTON, TEXAS.

LINK.

1,421,997.   Specification of Letters Patent.   Patented July 4, 1922.

Application filed July 13, 1920. Serial No. 395,919.

*To all whom it may concern:*

Be it known that I, JOHN V. SANDQUIST, a citizen of Canada, residing at Houston, in the county of Harris and State of Texas, have invented new and useful Improvements in Links, of which the following is a specification.

This invention has for its object the provision of links for a chain or the like, the links being designed so that any number of the links can be readily assembled or disassembled, the invention being provided with self locking features so that the links cannot be casually separated or disengaged.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein.

Figure 1:
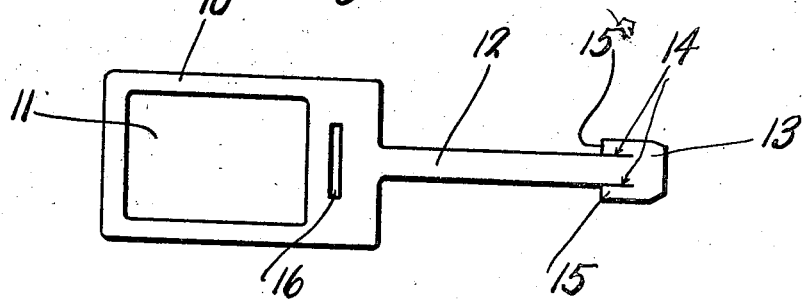
Figure 1 is a view in elevation of a link constructed in accordance with one form of the invention.
Figure 2:
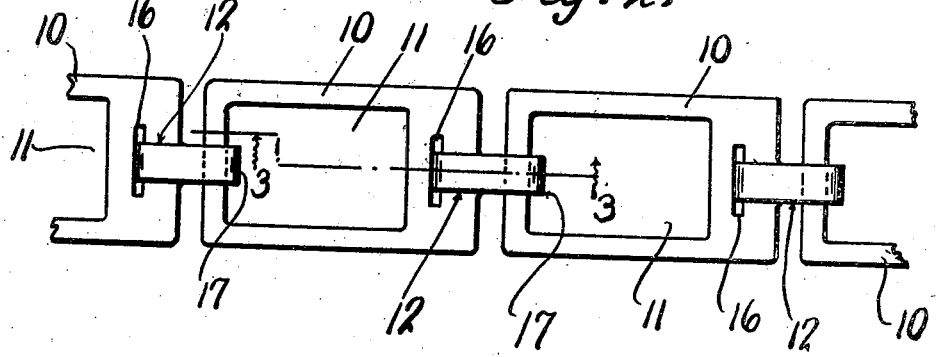
Figure 2 is a fragmentary view of a chain made up of the links shown in Figure 1.
Figure 3:
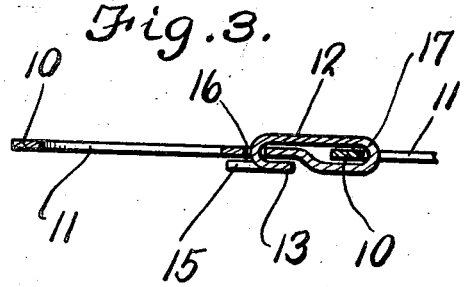
Figure 3 is a sectional view taken on line 3—3 of Figure 2.

Referring to the drawings in detail 10 indicates a link which may be constructed from any suitable material and provided with an opening 11 by means of which the various links of the chain may be readily and easily connected. Projecting from one end of the link is a substantially T-shaped bendable member the stem of which is indicated as at 12 and the head at 13. This head is slotted as at 14 to provide locking tongs 15. The ends of the links from which the stem 12 projects, is provided with a transverse slot 16 through which the stem is passed when the latter is bent upon itself to provide a loop 16′. The link is shown in plan in Figure 1 and when its use is desired, the stem 12 is bent upon itself to provide a loop, the stem together with the head 13 being passed through the slot 16. The head 13 is then bent in a direction of the adjacent end of the link 10 to bear against the side of the link directly opposite the side against which the stem engages, and when the head is bent in this manner, the locking tongs 15 project in an opposite direction across the slot 16. It is of course understood when the links are being associated, the stem 12 of one link is passed through the opening 11 of the adjacent link before the stem is passed through the slot 16 of its respective link. In this manner, the link may be readily assembled and when associated held against casual separation.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A link comprising a member having an opening therein, a substantially T-shaped bendable member adapted to be bent upon itself to provide a loop and having the head thereof associated with the link and bendable tongues forming an integral part of the structure for locking the head in active association with the link.

2. A link comprising a member having an opening therein and a transversely disposed slot beneath the opening, a bendable T-shaped member projecting from one end of the link and adapted to be bent upon itself to provide a loop, the head of said bendable member being passed through said slot and means for holding said head operatively associated with the link.

3. A link comprising a member having an opening therein, a substantially T-shaped bendable member adapted to be bent upon itself to provide a link and having its head passed through said opening, and arranged at one side of the link and bendable tongues forming part of said head of the link for locking the same in an active position with the link for the purpose specified.

4. A link comprising a member having an opening therein, and a transversely disposed slot, a substantially T-shaped bendable member adapted to be bent upon itself to provide a loop and having a head thereof arranged at one side of the link, said head projecting in one direction from said slot, and bendable tongues forming an integral part of the structure and extended in an opposite direction from the head and said slot for locking the head in active association to the link.

5. A link comprising a member having an opening therein, a substantially T-shaped bendable member adapted to be bent upon itself to provide a loop and having the head passed through said opening and arranged at one side of the link, said head being slotted at opposite sides of said member to provide bendable tongues adapted to extend across said opening in a direction opposite from that of said head for the purpose specified.

In testimony whereof I affix my signature.

JOHN V. SANDQUIST.